Figure 1:
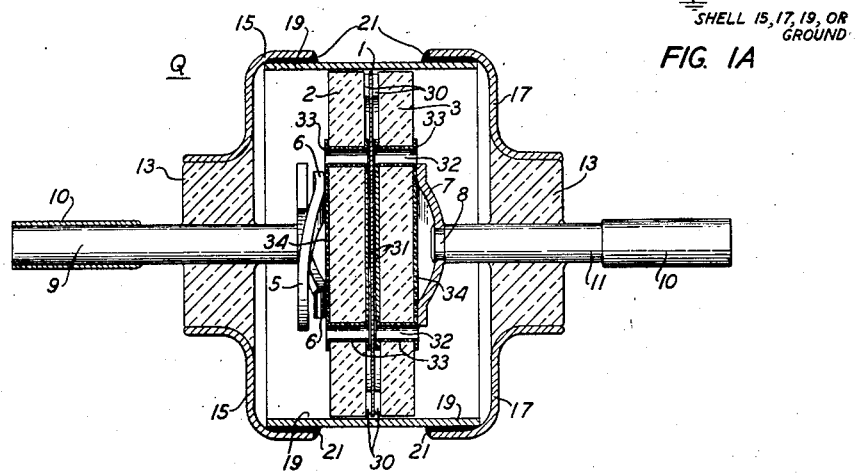

Nov. 9, 1948.　　　　H. HAVSTAD　　　　2,453,435
PIEZOELECTRIC CRYSTAL APPARATUS

Filed Dec. 28, 1945　　　　4 Sheets-Sheet 1

INVENTOR
H. HAVSTAD
BY
W. J. O'Neill
ATTORNEY

Nov. 9, 1948. H. HAVSTAD 2,453,435
PIEZOELECTRIC CRYSTAL APPARATUS
Filed Dec. 28, 1945 4 Sheets-Sheet 2

INVENTOR
H. HAVSTAD
BY
W. J. O'Neill
ATTORNEY.

Nov. 9, 1948. H. HAVSTAD 2,453,435
PIEZOELECTRIC CRYSTAL APPARATUS
Filed Dec. 28, 1945 4 Sheets-Sheet 4

INVENTOR
H. HAVSTAD
BY
W. J. O'Neill
ATTORNEY

Patented Nov. 9, 1948

2,453,435

UNITED STATES PATENT OFFICE 2,453,435

PIEZOELECTRIC CRYSTAL APPARATUS

Harald Havstad, Northport, N. Y., assignor to Bell Telephone Laboratories, Incorporated, New York, N. Y., a corporation of New York Application December 28, 1945, Serial No. 637,662

19 Claims. (Cl. 250—36)

This invention relates to piezoelectric crystal apparatus and particularly to piezo electric crystal mountings, holders and circuits for high frequency thickness-mode piezoelectric crystal elements, such as harmonic mode quartz crystal elements suitable for use as circuit elements in oscillation generator systems and electric wave filter systems for example.

One of the objects of this invention is to improve the frequency stability of piezoelectric crystal apparatus.

Another object of this invention is to increase upwardly the range of useful frequencies in piezoelectric systems.

Another object of this invention is to provide improved mountings for high frequency thickness-mode piezoelectric crystal elements.

Another object of this invention is to provide improved control of the electrode area and air-gap spacing in pressure type piezoelectric crystal units.

Another object of this invention is to effectively reduce to zero value the capacity that shunts or parallels the piezoelectric crystal body, due to the crystal holder and its socket connections.

In piezoelectric crystal systems such as those employing piezoelectric quartz crystal elements as circuit elements, the crystal electrodes are used to provide the coupling between the associated electrical circuit and the quartz crystal plate and to impress upon the quartz plate the voltage that is necessary to force the quartz element into vibration. It is generally desirable that the crystal electrodes have little or no adverse damping effect on the desired mode of operation of the quartz plate, and that they be designed to retain the inherently high reactance-resistance ratio Q and frequency stability of the quartz crystal plate itself.

There are two general types of electrodes in common use. One of these consists of thin metallic or other conductive films deposited directly on the proper surfaces of the quartz crystal plate. This type of plated electrode being integral with the crystal element follows the mechanical vibration of the crystal element and, accordingly, tends to modify somewhat the resultant properties of the crystal element. The chief advantages of its use include good control of the field-producing electrode area, ease of frequency adjustment by control of the amount of deposited metal, and lightness in weight.

Another type of crystal electrode comprises the air-gap type in which the field-producing electrodes are separated from the quartz crystal element by a very small air-gap, which may be of the order of 10 to 20 microns, for example. With this air-gap type of electrode, the quartz crystal plate is free to vibrate with very little interference from the spaced electrodes, provided the air-gap is correctly proportioned with respect to the known acoustical effect. In the so-called pressure type crystal units, the air-gap may be produced by means of small raised lands or portions disposed at or near the corners or the peripheral edges of the flat electrode surface, the raised portions resting against the major surface of the quartz plate at or near the corners or periphery thereof. Such pressure type electrodes have commonly been made of stainless steel produced by a coining or machining process, and difficulties have been heretofore experienced in practice in maintaining close tolerances in manufacture, and moreover after such metal electrodes have been shaped satisfactorily, additional difficulties have heretofore been introduced by cold-flow of the metal electrode plate itself.

In accordance with this invention, the crystal electrodes may each be composed of a plate of insulating material, such as, for example, a circular-shaped ceramic, glass, fused quartz or other suitable insulating disc having substantially flat and parallel major surfaces which are provided with suitable metallic or other conductive films. This electrode arrangement may be insulated in such a way that it may be used with advantage in a metal container, and it may be so arranged as to provide good control of the field-producing electrode area, and of the air-gap spacing with respect to the associated crystal element, and of the electrical connections extending to the exterior of the crystal unit. The ceramic or other insulating electrode member provided in accordance with this invention may have one or more small holes or slots extending through its body, the holes or slots being filled or coated with suitable conductive material, such as commercial baked silver paste or other suitable metallic paste. On one of the major surfaces of each of the ceramic discs a small baked silver paste plating, which may be non-critical in size, area and thickness, may be deposited and electrically connected with the conductive silver paste in the holes or slots provided in the ceramic plate. On the other flat major surface of the ceramic plate, a small metallic electrode coating composed of evaporated silver of controlled area and thickness may be centrally deposited in electrical connection with the conductive silver material disposed in the holes or slots of the ceramic plate. Toward the circumference of the ceramic plate, another evaporated silver film may be deposited in the form of a narrow strip which may be divided or cut in parts lengthwise in order to prevent induced currents from flowing therein. The thickness of this strip of metallic coating determines the air-gap spacing between the crystal element and the central metallic coating forming the central field-producing electrode. The baked silver paste type coatings, and also the evaporated silver type of coatings adhere well to the ceramic body and may be used to obtain precision control of the air-gap formed with the associated crystal element.

The frequency stability of high frequency thickness-mode piezoelectric crystal elements, such as harmonic mode AT or BT cut quartz crystal plates, may be improved by utilizing such partial or reduced area central field-producing electrodes and marginal clamping risers comprising suitably located metallic coatings formed integral with the flat adjacent major surfaces of a pair of similar ceramic plate-like elements, between which the crystal plate may be disposed and clamped about its periphery. Suitable spring means may be provided for providing the clamping pressure on the margins of the crystal plate.

In oscillatory piezoelectric crystal elements of the high frequency type employing thickness modes of vibration, it has been difficult heretofore to utilize in practical systems the higher order mechanical harmonics of the crystal element. In accordance with this invention, such high order harmonics of crystal elements may be practically made use of, and crystal mountings and circuits may be provided which enable the crystal element itself to oscillate efficiently at very high frequencies.

Figure 1A:
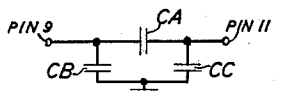
Figure 2:
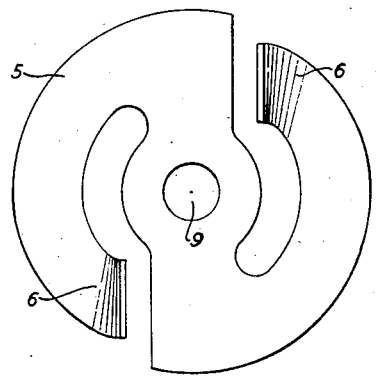
Figures 3, 4:
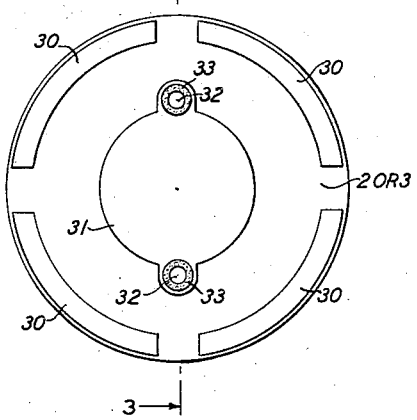
Figure 5:
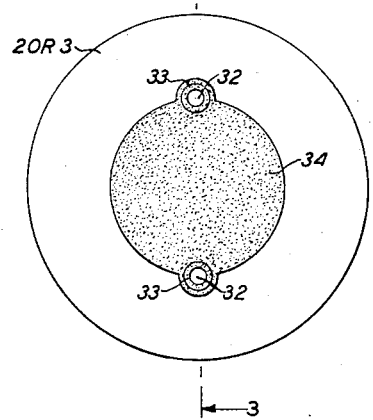
Figure 6:
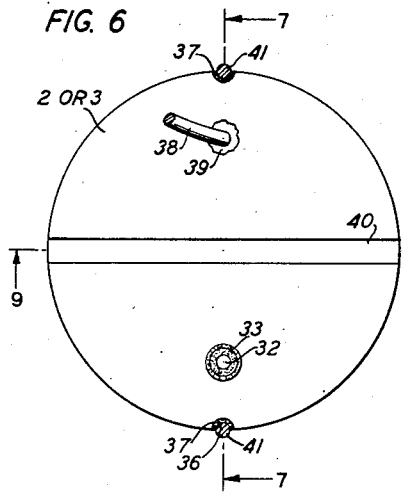
Figure 7:
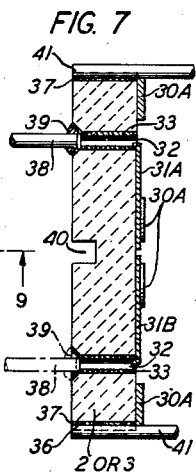
Figure 8:
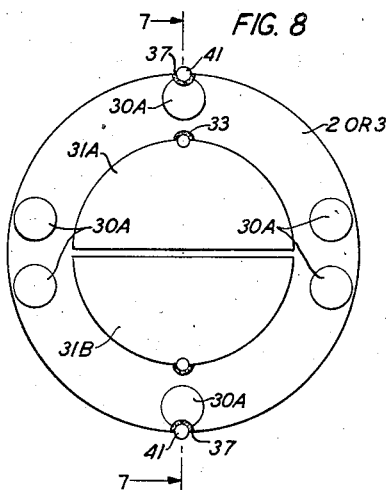
Figure 9:
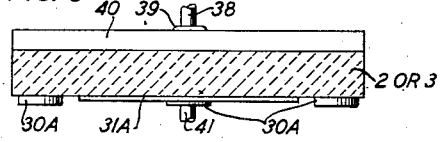
Figure 13:
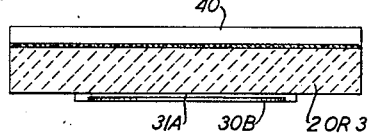
Figure 10:
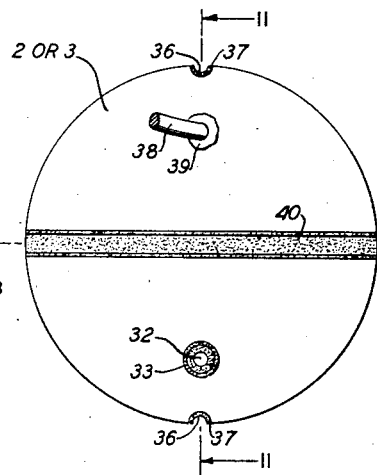
Figure 11:
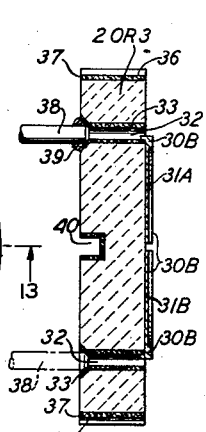
Figure 12:
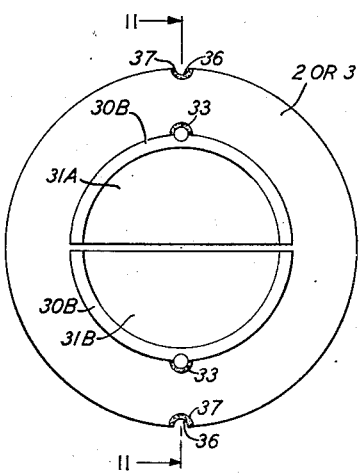
Figure 16:
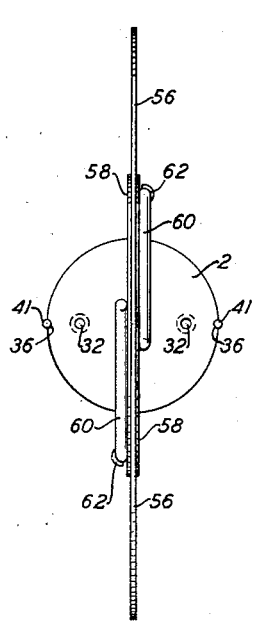
Figure 14:
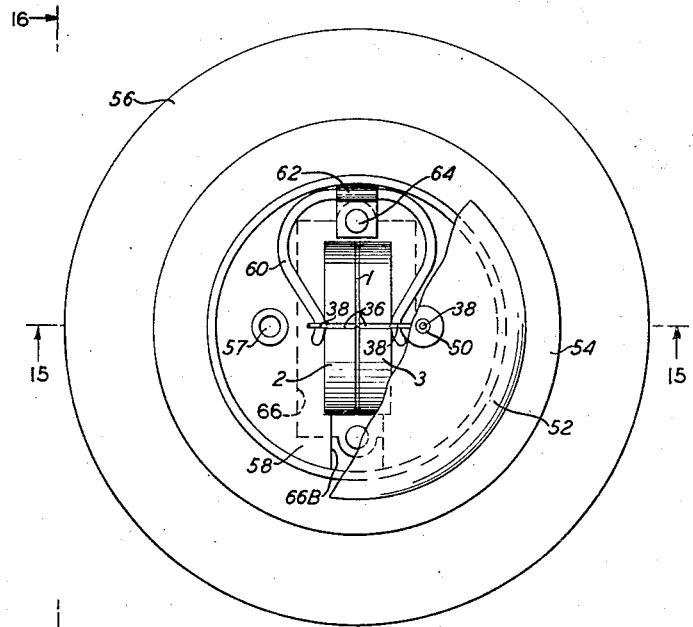
Figure 15:
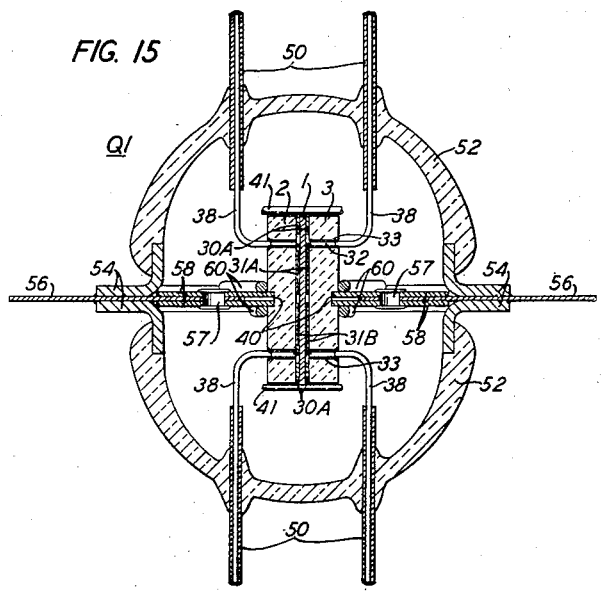

For a clearer understanding of the nature of this invention and the additional advantages, features and objects thereof, reference is made to the following description taken in connection with the accompanying drawings, in which like reference characters represent like or similar parts and in which:

Figs. 1 to 5 are enlarged views of a crystal unit constructed in accordance with this invention, Fig. 1 being a sectional view showing the general assembly of the crystal unit, Fig. 1A being a diagram illustrating the capacity distribution of the crystal unit of Fig. 1, Fig. 2 being a detailed view of the crystal clamping spring shown in Fig. 1; Fig. 3 being an edge view in section taken on the line 3—3 of Figs. 4 and 5 and showing either of the two metallized ceramic electrode discs illustrated in Fig. 1, and Figs. 4 and 5 being major face views of the two opposite sides of the electrode body shown in Fig. 3;

Figs. 6 to 9 are views showing a modification of the electrode disc illustrated in Figs. 3 to 5, Fig. 7 being a sectional edge view taken on the line 7—7 of Figs. 6 and 8 which represent opposite major face views of the disc shown in Fig. 7, and Fig. 9 being a view taken on the line 9—9 of Fig. 6;

Figs. 10 to 13 are views showing a modification of the electrode disc illustrated in Figs. 6 to 9, Fig. 11 being a sectional edge view taken on the line 11—11 of Figs. 10 and 12 which illustrate opposite major face views of the disc shown in Fig. 11, and Fig. 13 being a sectional view taken on the line 13—13 of Fig. 10;

Figs. 14 to 16 are enlarged views of another form of crystal unit which utilizes divided type field-producing electrodes, Fig. 15 being a view taken on the line 15—15 of Fig. 14, and Fig. 16 being a partial view taken on the line 16—16 of Fig. 14; and Figs. 17 to 22 are circuit diagrams of various types of oscillation generators which may be utilized with crystal units as illustrated in Figs. 1 to 16.

Referring to the drawing, Fig. 1 is an enlarged view in section of a crystal unit comprising a piezoelectric crystal element 1 which may be in the form of a relatively thin circular-shaped quartz crystal disc or plate as illustrated in Fig. 1, a pair of circular-shaped similar electrode members 2 and 3 each of which may be comprised of a ceramic or other suitable insulating disc having the same diameter as that of the crystal disc 1 which is clamped therebetween, the ceramic discs 2 and 3 being provided with suitable metallic coatings as described more fully hereinafter and as illustrated in Figs. 3 to 5.

As illustrated in Fig. 1, the assembly comprising the crystal plate 1 and the two associated electrode members 2 and 3 may be resiliently compressed between a suitable spring 5 disposed adjacent the disc 2, and a suitable contact bracket 7 disposed adjacent the other disc 3, the spring 5 and the bracket 7 being carried by and mounted on the ends of the coaxial pins or rods 9 and 11 respectively. The pins 9 and 11 may be composed of "Kovar" metal or other suitable material and may extend through suitable openings in the central part of each of two glass or other insulating seals 13 which may be inserted in the two opposite small ends of two metal covers 15 and 17 respectively of a cylindrical metal casing 19. The end covers 15 and 17 may be constructed of "Kovar" metal or other suitable metal, and may be secured to the cylindrical metal case 19 by solder joints 21 which may surround the entire inner rim of the metal covers 15 and 17 at points adjacent the metal case 19. Alternatively, the covers 15 and 17 may be secured to the case 19 by any other suitable sealing means, such as that shown, for example, in U. S. application for patent, Serial No. 623,150, filed October 18, 1945 by L. J. LaBrie. As shown in Fig. 1, the extreme peripheral edges of the two ceramic discs 2 and 3 and also of the piezoelectric crystal disc 1 may be disposed in loose fitting contact relation with respect to the inner wall of the cylindrical metal case 19; and the outer end portions 10 of each of the two metal pins 9 and 11 may be silver plated, if desired, in order to provide good electrical contact connections with suitable spring clips or sockets (not shown) in which they may be mounted. Individual external electrical connections to the opposite major faces of the piezoelectric crystal element 1 may be established through the two conductive pins 9 and 11, the conductive spring 5 and the conductive bracket 7, the spring 5 and bracket 7 contacting suitable metallic coatings 34 disposed on the outermost major faces of each of the two ceramic discs 2 and 3. Such outer coatings 34 may be connected, by means of suitable connectors 33 disposed in one or more holes or slots 32 provided in the body of each of the ceramic discs 2 and 3, to suitable electric field-producing coatings 31 formed integral with the inner major faces of the two ceramic discs 2 and 3, as illustrated in Figs. 3 to 5 and as described more fully hereinafter.

As shown in Fig. 1, the conductive contact 7 may be formed from a suitable circular-shaped brass or other metal disc, pressed out at its central region into a disc-shaped bracket 7, as illustrated in the edge view shown in Fig. 1. At its center, the bracket 7 may be provided with a small circular hole 8 for mounting the bracket 7 on the end of the supporting rod 11, and the contact bracket 7 may be plated with tin or other suitable metal in order to provide good electrical conductivity.

Fig. 1A is a diagram illustrating the electrical capacity distribution that may be obtained in the crystal unit assembly shown in Fig. 1. As shown in Fig. 1A, $C_A$ is the capacity produced by the quartz plate 1 and the two metallic electrodes 31. $C_B$ is the capacity between the pin 9, spring 5 and the shell comprising the casings 15, 17 and 19. $C_C$ is the capacity between pin 11 and shell. The capacity configuration as shown in Fig. 1A may be made use of to produce a low shunt capacity crystal oscillator circut suitable for high harmonic mode crystal operation as will be shown hereinafter.

Fig. 2 is an enlarged front view of the conductive clamping spring 5, an edge view of which is shown in Fig. 1. As illustrated in Fig. 2, the spring 5 may be formed from a blank circular-shaped sheet of hardened beryllium copper, or from other suitable spring material, and after forming the two spring arms 6 from the sheet metal, the spring 5 may be heat treated and then silver plated to provide good electrical conductivity. As shown in Fig. 1, the spring arms 6 of the spring 5 may make direct electrical and mechanical contact with the metallic coating 34 disposed on the outermost major face of the adjacent ceramic disc 2 and thereby function to establish electrical connection with as well as to apply clamping pressure to the piezoelectric crystal element 1.

The piezoelectric crystal element 1 may be any suitable piezoelectric element such as a thickness shear mode AT or BT cut quartz crystal element operated at its fundamental frequency or at any odd order mechanical harmonic of its fundamental thickness mode of motion. Such AT and BT cut quartz crystal plates are disclosed, for example, in United States Patent No. 2,218,200 issued October 15, 1940 to Lack, Willard and Fair; No. 2,260,707 issued October 28, 1941 to I. E. Fair; and No. 2,343,059 issued February 29, 1944 to S. C. Hight. In order to prepare such a crystal element 1 for use in the holder illustrated in Fig. 1, the crystal blank 1 may be lapped in a suitable lapping machine using a mixture of emery, soap and water for lapping purposes and using a rough polishing compound. After cleaning the crystal plate 1 in soap and water and carbontetrachloride, it may be measured for flatness by use of green light to observe the interfering fringes produced by the reflections from the two major surfaces of the quartz plate 1 which, when finished, may have substantially flat major surfaces of slightly convex shape. While the present invention is described particularly in connection with an AT or BT cut quartz crystal element 1, which employs thickness vibrations of the shear type, it will be understood that the piezoelectric crystal plate 1 may be any suitable piezoelectric element 1.

Figs. 3, 4 and 5 are edge, front and back views respectively, illustrating the details of construction of each of the two similar metallized ceramic electrode discs 2 and 3, between which the crystal element 1 of Fig. 1 may be clamped by means of a suitable compression force exerted by the spring prongs 6 of the clamping spring element 5, as illustrated in Fig. 1. In this arrangement, the high frequency thickness-mode crystal element 1 is mounted between the two electrode plates 2 and 3 which are composed of ceramic or other suitable insulating material, and which are provided adjacent their margins with a plurality of metallic risers or protruding portions 30, as shown in detail in Figs. 3 and 4, through which sufficient clamping force may be applied by the spring 5 to the major face margins of the crystal element 1 to prevent its bodily displacement with respect to the clamping discs 2 and 3.

The air-gap lies between a centrally disposed field-producing electrode coating 31 and the adjacent electrode face of the crystal element 1, and may be critically controlled by close control of the relative thicknesses of the deposited metal coatings forming the central electric field-producing electrode 31 and the peripheral risers 30. It is possible to control the thickness of the coatings 30 and 31 to better than ¼ of a micron. Usually, good amplitude of vibration of the crystal element 1 may be achieved when the central riser 31 on each of the ceramic discs 2 and 3 provides an air-gap of about 2 to 4 microns with respect to the adjacent major surface of the crystal element 1, the central riser 31 having a rise, somewhat less than that of the marginal arcuate risers 30. The central riser 31 comprises the effective field-producing electrode surface of each of the ceramic plates 2 and 3. The thickness of the ceramic plates 2 and 3 may be sufficient to keep them mechanically rigid. The rise of the central electrode riser 31 will depend to some small extent upon the flexibility of the rigid ceramic plate, but will ordinarily be very slightly less than the rise of the four clamping faces of the four marginal risers 30. While in Figs. 3 and 4, four marginal clamping risers 30 of equal height are illustrated, it will be understood that the number of such crystal clamping risers 30 may be more or less than four risers 30.

In using a piezoelectric crystal plate 1 adapted for high frequency or short wave applications, the frequency of vibration is determined mainly by the thickness dimension which is the thin dimension of the crystal plate 1. Rigid clamping near the edges, or periphery of the crystal plate 1 is effective in suppressing spurious frequencies and stabilizing the desired frequency. The four raised metallic rims or lands 30 disposed on the inner face of each of the two electrode members 2 and 3 engage and rigidly clamp the crystal plate 1 at the peripheral or marginal portion thereof, under pressure from the spring 5, the field-producing central electrodes 31 being barely out of direct contact with the adjacent major surfaces of the crystal plate 1.

As an illustrative example in a particular case, the ceramic base discs 2 and 3 may each have a diameter of about one-half inch or other size and shape to suit the dimensions of the crystal element 1 with which the discs 2 and 3 are associated. The thickness of the ceramic discs 2 and 3 may be of the order of one-sixteenth inch or of other suitable thickness value in order to provide a suitable mechanical stability. Each of the ceramic discs 2 and 3 may be provided with one or more holes 32 extending through the body of the ceramic discs 2 and 3 from one major face to the opposite major face thereof. The two holes 32, as illustrated in detail in Figs. 3, 4 and 5, may be located on a major face diameter about equidistant from the center of the major face of each disc 2 and 3. The two holes 32 at their opposite ends may be slightly enlarged and rounded off to merge smoothly with the opposite major faces of each disc 2 and 3. The holes 32 may be filled with or the inner walls of the two holes 32 may be painted or otherwise coated with a layer of liquid metallic paste, such as "Hanovia" silver paste and afterwards baked in a known manner at a required temperature which may be of the order of 500° to 600° C., in order to form firm electrically conductive metallic connection coatings 33 extending from one to the opposite major face of each of the ceramic discs 2 and 3.

Before applying any of the metallic coatings 30, 31 or 33 to the ceramic discs 2 and 3, the major faces of each of the ceramic discs 2 and 3 may be lapped down flat to the desired thickness on any suitable lapping machine. A flatness for each of the major faces of the discs 2 and 3 of the order of ±0.5 micron or better may be obtained by the lapping process. It is desirable that the major surfaces of the ceramic discs 2 and 3 facing the crystal element 1 be made as flat as is conveniently possible. A ceramic material based upon the magnesium silicates, or upon other suitable insulating material, possesses small dielectric losses and has a very small or nearly zero temperature coefficient of expansion so that the dimensions and consequently the frequency do not vary much with ordinary variations in temperature. The type of ceramic used in the construction of the electrode members 2 and 3 may comprise highly dense material having good electrical properties at the frequency or frequencies at which it is to be used. When the ceramic or other insulating material used in the construction of the discs 2 and 3 has a low temperature coefficient of expansion equal to that of the quartz crystal element 1, the frequency of oscillation of the crystal unit may remain nearly constant with changes in the temperature over ordinary temperature ranges.

As particularly illustrated in Figs. 1, 3 and 5, on the outermost major face of each of the ceramic discs 2 and 3, a terminal coating 34 composed of metallic material such as baked silver paste or other metallic paste may be deposited in such a manner as to connect electrically with the conductive baked silver paste connectors 33 disposed in the two holes 32, thereby to provide an electrical connection from the terminal coating 34 to the associated central electrode coating 31. The terminal plating 34 need not be critical in size, area, shape or thickness and may as shown, for example, in Fig. 5 be roughly circular in shape and of a small diameter such as, for example, about one-quarter inch in diameter.

As particularly illustrated in Figs. 1, 3 and 4, on the innermost major face of each of the ceramic discs 2 and 3, a thin film of metallic coating 31 such as a film of silver, gold or other suitable metal or metals may be deposited in electrical connection with the baked silver paste or other metallic paste connector coatings 33 disposed in the two holes 32 of each of the ceramic discs 2 and 3. The thin film 31 of silver or other metallic coating may be deposited by evaporation in vacuum or by other suitable process, the position, area and shape of the metallic film 31 being controlled by using a suitable masking jig during the evaporation of the metallic film 31 on the inner major surface of each of the ceramic discs 2 and 3. The thickness of the metallic film 31 may be approximately 0.5 micron, or other suitable value, and may easily be controlled by a measured amount of silver put on the evaporating filaments in the vacuum chamber of the evaporating machine (not shown). As an illustrative example in a particular case, the amount of silver required to produce a 0.5 micron thickness for a film disc 31 evaporated on the ceramic disc 2 or 3 was twelve inches in length of 10-mil diameter silver wire. If eleven inches instead of twelve inches had been used in the particular example mentioned, the corresponding thickness of the evaporated disc film 31 would be about $\frac{11}{12}$ × 0.5 micron. The desired tolerance in practice for the thickness of the film 31 would be +0.25 micron and −0. It will be understood that the thickness of the metallic film 31 is critical in determining the relative air-gap spacing between the metallic film 31 and the adjacent major face of the crystal element 1, and that it is desirable to control such air-gap spacing closely, especially when the crystal element 1 is operated at a high order harmonic of its fundamental thickness-mode frequency, giving a high output frequency which may be of the order of 200 megacycles per second or more. The face area of the metallic films 31 determines the electric field-producing electrode area for the quartz crystal element 1 and as shown in the assembly illustrated in Figs. 1, 3 and 4, may be placed concentrically with respect to the major face area of the associated crystal element 1.

As particularly illustrated in Figs. 3 and 4, near the periphery or circumference of the inner major face of each of the ceramic discs 2 and 3, the silver films or coatings 30 may be deposited in the form of an arcuate strip or plurality of such strips and may be deposited by evaporation in vacuum, using a suitable masking jig. It will be understood that the strips 30, as illustrated in Fig. 4, may be separated into four or other number of parts in order to prevent induced currents from flowing around the metallic ring 30, and also in view of practical considerations involved in using a masking jig. The film strips 30 are made of equal thickness and of a uniform thickness value slightly greater than the thickness value of the central metallic coating 31, from which the strips 30 are spacially separated on the inner major face of each of the ceramic discs 2 and 3.

Before applying the evaporated metallic coatings 30 and 31, each of the "steatite" ceramic discs 2 and 3 has been lapped flat within about one-half micron by using a suitable lapping machine which may be of the type that are now used for fine lapping of piezoelectric quartz crystal plates. The centered metallic coating electrode 31 of about one-half micron in thickness may be deposited by evaporation of metal on one side only of each ceramic disc 2 and 3, using a suitable mask; and toward the peripheral edge of the same side of each of the ceramic discs 2 and 3, the metallic platings 30 of about 4 microns in thickness may be deposited by evaporation of metal, using a suitable mask. The electrical connection to the central electrode coating 31 is made through one or more small holes 32 in the body of each of the ceramic discs 2 and 3, the holes 32 being previously filled with baked silver paste or other suitable conductive metallic paste, which is connected by contact with the metallic terminal coating 34 on the other side of each of the ceramic discs 2 and 3.

In general, the metallized ceramic body 2 or 3 may be processed as follows: apply and bake the silver paste 33 in the holes 32, lap the ceramic disc 2 or 3 to size using emery until the major surfaces of the ceramic body 2 or 3 are flat and parallel within about one micron, apply and bake the silver paste coating 34 to one side; clean the opposite side by a few strokes of lapping by hand, apply the evaporated silver coatings 30 and 31 to critical thicknesses, and burnish the evaporated silver coatings 30 and 31.

As an illustrative example in a particular case, each of the discs 2 and 3 may be composed of highly dense "steatite" ceramic having a thickness of about 0.061 inch and a diameter of about 0.496 inch, each disc being provided with two holes 32 located on a major face diameter and spaced about 0.125 inch from the center of the disc. The holes 32 in each disc 2 and 3 may have a diameter of about 0.02 inch with widened end portions curved with a radius of about 0.005 inch, as illustrated in Fig. 3. The desired thickness dimension for each of the discs 2 and 3 may be obtained by lapping it after the "steatite" is molded and fired, and the ends of the .02 diameter holes 32 may be countersunk after such lapping operation. The four evaporated metal marginal strips 30 may have a width of about 0.031 inch and may be spaced apart between their ends about 0.062 inch, and may have a uniform thickness of about 4.0 microns. The evaporated metal central electrode 31 may have a smaller thickness as of about 0.5 micron and an effective diameter of about 0.25 inch, or other suitable value according to the frequency, and may be located concentrically with respect to the periphery of each of the discs 2 and 3. The terminal coating 34 composed of baked silver paste may have a thickness of about 0.002 inch and a diameter of any convenient value such as about 0.25 inch, and may be located concentrically with respect to the periphery of each of the discs 2 and 3. The baked silver paste 33 in the holes 32 makes the electrical connection between the baked silver paste area 34 on one side and the evaporated silver central area 31 on the other side of each of the discs 2 and 3.

While the present invention has been described particularly in connection with silver coatings 30 and 31 deposited by evaporation in vacuum, it will be understood that the integral coatings 30 and 31 may consist of thin coatings of gold, platinum or other suitable conductive material or materials deposited on the surface of the ceramic plates 2 and 3 by any suitable process such as by evaporation in vacuum, sputtering, electroplating or otherwise. The baked metallic paste coatings 33 and 34 may consist of silver as particularly described herein, or of gold or other suitable metallic paste baked onto the surfaces of the ceramic bodies 2 and 3. Evaporated silver and baked silver paste have been found to adhere excellently to the ceramic body, without peeling.

While particular configurations for the electrode members 2 and 3 and for the metallic coatings 30 to 34 thereon, have been illustrated by way of example, it will be understood that other forms of crystal electrodes may be designed in accordance with the principles of the invention. For example, the metallic area 34 comprising the coating of silver paste may be omitted and a suitable number of terminal wires may be soldered or otherwise connected directly to the metallic material 33 deposited in the holes 32 in the body of each of the discs 2 and 3. When two separate pairs of field-producing electrodes for a single crystal I are desired, four such terminal wires may be utilized and the metal plated electrode area 31 may be centrally divided or split in order to form the two separate pairs of useful field-producing electrodes for the single crystal element I, as illustrated in the modification shown in Figs. 6 to 9.

Figs. 6 to 9 are views showing a modification in the construction of the metal-coated "steatite" ceramic electrode disc 2 or 3 illustrated in Figs. 3 to 5. Fig. 6 is a major face view of the outer face, Fig. 7 is an edge view in section taken on the line 7—7 of Figs. 6 and 8, Fig. 8 is a major face view of the inner face, and Fig. 9 is an edge view in section taken on the line 9—9 of Fig. 6. As shown in Figs. 6 to 9, each of the two ceramic discs 2 and 3 may be provided with six circular-shaped marginal clamping lands 30A which may be composed of evaporated silver spots of about 5 microns thick, the metallic spots 30A being spaced about the margin or periphery of the inner major face of each of the insulating ceramic discs 2 and 3.

As shown in Figs. 6 to 8, small, semi-circular grooves 36 may be provided in diametrically opposite edges of each of the two ceramic discs 2 and 3, the grooved surfaces 36 being coated with baked silver paste coatings 37 which may for example be disposed adjacent the two associated metal-coated clamping risers 30A as shown in Figs. 7 and 8. To each of the two metal coatings 37 deposited in the grooves 36 may be soldered a silver wire 41 which may be used for the purpose of alignment of the two electrode discs 2 and 3, when split metallic electrodes 31A and 31B are desired, as in Fig. 8. The wires 41 are soldered in the grooves 36 of one electrode disc 2 or 3, but not in the grooves 36 of the other electrode disc. When the two electrode discs 2 and 3 and the crystal plate I are assembled, the wires 41 will have a sliding fit in the grooves 36 of the second electrode disc, the crystal plate diameter being small enough to fit between the wires 41.

Spaced inwardly of the six marginal clamping risers 30A on the same major face of each ceramic disc 2 and 3 as shown in Fig. 8, divided or split electrode coatings 31A and 31B of over-all circular form may be provided to constitute two separate semi-circular-shaped field-producing electrodes for use with a single crystal element I as shown in Figs. 14 to 16. The electrodes 31A and 31B shown in Figs. 7 to 9 may be composed of evaporated silver coatings of about 2 microns thickness formed integral with the central portion of the inner major face of each of the ceramic discs 2 and 3, and being split coatings 31A and 31B may be individually connected with the two metal coating connectors 33 formed in the two openings 32 in each of the two ceramic discs 2 and 3, the connectors 33 being, as hereinbefore described, conductive baked silver paste material deposited within the holes 32 on or within the inner walls thereof. External electrical connections may be individually established by means of two conductive wires 38 secured by solder masses 39, or by other suitable means, to the respective metallic coatings 33 disposed in the two holes 32 of each of the ceramic discs 2 and 3. In this manner individual electrical connections may be established with the divided field-producing electrode coatings 31A and 31B respectively.

As illustrated in Figs. 6, 7 and 9, the outer major face of each of the ceramic discs 2 and 3 may be provided with a slot 40 and utilized for the purpose of supporting the crystal and electrode assembly and also to electrostatically shield the metallic electrode 31A from the metallic electrode 31B, as illustrated in Figs. 14, 15 and 16. It will be noted that in the modification illustrated in Figs. 6 to 9 as compared with that illustrated in Figs. 3 to 5, the field-producing electrodes 31A and 31B are of the divided type instead of being non-divided as the electrode 31, that the terminal connectors comprise wires 33 instead of a terminal coating 34, and that the clamping risers comprise circular spots 30A instead of arcuate strips 30.

Figs. 10 to 13 are views illustrating another modification in the metallized electrode members 2 and 3. In Figs. 10 to 13, the arrangement is similar to that shown in Figs. 6 to 9 in respect to the ceramic disc 2 or 3 and its several metallic coatings. However, in the modification shown in Figs. 10 to 13, the outer or marginal clamping risers 30B of evaporated metal coatings are comprised of two separated arcuate clamping rims 30B which are disposed along the peripheral semicircular edges of the two field-producing electrode coatings 31A and 31B. In this arrangement, the clamping rims 30B may be conveniently adapted to engage the crystal element 1 in its peripheral region or at some distance back from the peripheral edges thereof.

The over-all surface of the evaporated metal electrode coatings 31A and 31B applied to the inner flat major face of each of the ceramic discs 2 and 3, may be lapped slightly concave thereby providing a central concavity thereon of the order of about ¼ micron. As a result of such a concavity in the surface comprised by the metallic electrode coatings 31A and 31B, the peripheral rim portion thereof may be of itself used as clamping risers for the crystal element 1, without the addition thereto of the semicircular risers 30B. As shown in Figs. 10 to 13, the crystal clamping risers 30B may be added in the form of evaporated metal strips applied around the circumference of the coatings 31A and 31B. The clamping strips 30B applied on top of and at the periphery of the basic coatings 31A and 31B may be, for example about 1/64 inch in width and about ¼ micron in thickness, and of suitable dimension in over-all diameter from one outer edge to the opposite outer edge thereof. Where the clamping risers 30B are made about ¼ micron in thickness, the air gap spacing between the central coatings 31A, 31B and the adjacent major face of the associated crystal element 1 will be of about the same dimension as the rise of the risers 30B. As mentioned hereinbefore, the individual electrical connections to the electrode coatings 31A and 31B, respectively, may be established through the individual metal connector coatings 33 and the individual wires 38, the terminal wires 38 being secured by solder 39 to the associated connector coatings 33. The divided electrode coatings 31A and 31B may be separated from each other about .002 inch, or other suitable value, in order to provide two effective pairs of field-producing electrodes 31A and 31B for use with a single crystal element 1 disposed between the two electrode members 2 and 3 mounted in a suitable holder, as illustrated in Figs. 14 to 16, for example.

Figs. 14, 15 and 16 are views illustrating a crystal unit which may be used for mounting a harmonic mode piezoelectric crystal element 1 of the type described in connection with Fig. 1 disposed between a pair of metallized ceramic discs 2 and 3 of the types illustrated in either Figs. 6 to 9, or in Figs. 10 to 13, where the ceramic discs 2 and 3 are provided with two separate pairs of opposite field-producing electrodes 31A and 31B for operating the crystal element 1 disposed therebetween at a high frequency, which may be a high order mechanical harmonic or overtone of its fundamental thickness mode vibration.

As illustrated in Figs. 14 to 16, the ceramic base discs 2 and 3 may be of circular shape and of equal size, and each of them may be provided with suitable metallic coatings disposed on its inwardly disposed major surface thereof which is the surface adjacent the crystal element 1. Such metallic coatings may be of the type illustrated in Figs. 6 to 9 or in Figs. 10 to 13, the marginal coatings 30, 30A or 30B serving as crystal marginal clamping risers, and the central coatings 31A and 31B serving as central electric field-producing electrodes for applying two separate electric fields to the central region of the crystal element 1, which is disposed therebetween. The external electrical connections are individually established through the four terminal wires 38. The terminal wires 38 may extend from the interior to the exterior of the crystal unit shown in Figs. 14 to 16 through suitable seals 50 provided in the opposite end walls of a suitable enclosing container 52. The container 52 may be an evacuated glass bulb or other suitable container 52. The glass container 52 at its opposite sides may be provided with metal plate flanges 54 embedded in the walls of the two parts of the glass container 52 and soldered to an interposed metal plate 56, to which may be secured by suitable eyelets 57 the metal plates 58. The plates 58 may extend into metallized slots 40 provided in the outside major surface of each of the two ceramic discs 2 and 3. A pair of U-shaped springs 60, each secured by a clamp 62 and rivet 64 to the metal plates 56 and 58 may serve to apply a suitable compressive clamping force through the clamping risers 30A or 30B of the electrode disc members 2 and 3 to the crystal element 1 disposed therebetween.

As hereinbefore described, each of the ceramic discs 2 and 3 may be provided with two separate electric field-producing electrode coatings 31A and 31B which are individually electrically connected with the terminal wires 38, and which are arranged opposite each other when assembled in the crystal unit as shown in Figs. 14 to 16, the dividing lines separating the electrode coatings 31A and 31B of each of the ceramic discs 2 and 3 being disposed opposite each other and parallel to the metallized slots 40 provided in the outer major face of each of the ceramic discs 2 and 3, and parallel to the planes of the metal plates 58 extending into the metallized slots 40. Accordingly, in this arrangement as shown in Figs. 14 to 16, the metallic means including the assembled parts consisting of the metallized slots 40, and the metal plates 54, 56 and 58 may serve as an electrostatic shielding means effectively disposed between the two separate pairs of opposite field-producing electrode coatings 31A and 31B provided on the inner surfaces of the ceramic discs 2 and 3.

The wires 41 soldered to the metal coatings 37 in the coaligned grooves 36 provided in the opposite edges of the ceramic discs 2 and 3 may be used for the purpose of aligning the metallic electrodes 31A and 31B and also for preventing the quartz element 1 from sliding out from between the electrode discs 2 and 3.

As shown in Fig. 14, a rectangular slot 66 is provided in the plate 56 and another slot 66B is provided in the plate 58. The slot 66B in the plate 58 is provided so that the plates 58 may slide into the grooves 40 of the ceramic discs 2 and 3. Two plates 58 are used, one inserted at one end of grooves 40, the other plate 58 inserted at the other end of grooves 40 and the plate 56 inserted in between the two plates 58 as illustrated in Figs. 15 and 16. The slot 66 in plate 56 is arranged so that the two discs 2 and 3 and the crystal element 1 will fit within the slot 66. The size of slot 66 is provided so that some springiness is obtained in plates 58. The total thickness of plates 56, and two plates 58 are slightly more than the middle of the slot 40 and therefore, the inside edges of slot 66B in plates 58 will work as a spring lever against the edges of plate 56. This spring action prevents the electrodes 2 and 3 and crystal element 1 from moving with respect to the electrostatic shield plates 56 and 58. The outside diameter of plate 58 is such that it fits inside the glass holder 52 and only plate 56 extends outside the glass holder 52 for grounding and mounting purposes.

Various types of oscillator circuits may be associated with the piezoelectric crystal units illustrated in Figs. 1 to 16 for operating the crystal element 1 on a harmonic thickness mode of motion. In cases where the crystal element 1 is provided with a single pair of crystal electrodes 31 as illustrated in Figs. 1 to 5, the associated oscillator circuit for operating the crystal element 1 on a harmonic thickness mode of motion may be as illustrated in Figs. 17 to 20, for example.

Figure 17:
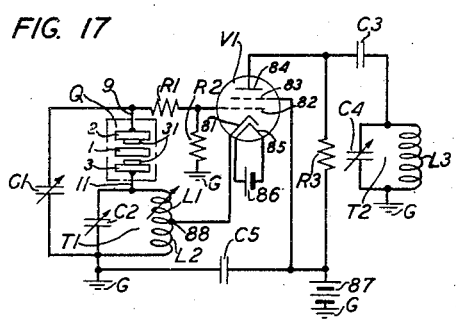

Fig. 17 is a circuit diagram of a crystal-controlled oscillation generator which may be utilized to generate frequencies that may be rather high order mechanical harmonics of the fundamental thickness-mode frequency of the piezoelectric crystal element 1, when used in a crystal unit as illustrated in Figs. 1 to 5, for example. While the particular crystal assembly and oscillator circuit may be utilized independently, it will be understood that they may be worked together in order to produce an effective high frequency crystal controlled oscillation.

As illustrated in Fig. 17, the oscillator circuit may include a suitable electron tube V1 which may be for example a 6AK5 or a 6AJ5 vacuum tube or any suitable pentode designed for high frequency use. The vacuum tube V1 may be a tube having a cathode 81, a control grid electrode 82, a screen grid electrode 83, and an anode or plate electrode 84. A suitable cathode heater 85 and power supply source 86 may supply energy for heating the cathode 81. A battery 87 or other suitable supply source of power may supply suitable positive potentials to the screen grid electrode 83 and the plate electrode 84 through a suitable resistor or resistors such as the resistor R3 connected between the plate electrode 84 of the vacuum tube V1 and the positive terminal of the supply source 87, the negative terminal of which is connected to ground G. Connected between the plate electrode 84 of the vacuum tube V1 and the ground G is an output circuit which may comprise a coupling condenser C3 connected in series-circuit relation with a tuned circuit T2 comprising a parallel-connected variable condenser C4 and inductance winding L3. The tuned plate circuit T2 as shown in Fig. 17 is electron-coupled with the screen grid electrode 83 and may be tuned to a frequency $nf$ where $n$ is a value equal to 1, 2, or 3, etc., and where $f$ is the effective harmonic or fundamental operating frequency of the crystal element 1 of the crystal unit. As illustrated in Fig. 17, a suitable by-pass condenser C5 may be connected between the output circuit and the input circuit of the vacuum tube V1, and a suitable grid resistor R2 may be connected from the control grid electrode 82 to the ground G. In the input circuit of the vacuum tube V1, a resistor R1, the crystal element 1 and a tuned circuit T1 consisting of a parallel-connected variable condenser C2 and an inductance winding L1, L2 may be connected between the ground G and the control grid electrode 82 of the vacuum tube V1. A tap 88 provided on the inductance windings L1, L2 may be connected with the cathode 81 of the vacuum tube V1. The tuned circuit T1 may be tuned to the frequency $f$ of the quartz crystal element 1 of the crystal unit Q, and a balancing or trimmer condenser C1 may be connected across the series-connected crystal unit Q and the tuned circuit T1.

As an illustrative example in a particular case using an AT or BT cut quartz crystal element 1 operating on a harmonic thickness mode of motion between 15 and 50 megacycles per second, the capacitative, inductive and other values of the component elements of the oscillator circuit shown in Fig. 17 may be approximately as follows: condenser C1 about 1.5 micromicrofarads or other suitable value to balance out the static capacitance of the crystal unit Q; condenser C2 about 25 micromicrofarads, condenser C3 about 15 micromicrofarads, condenser C4 about 20 micromicrofarads, condenser C5 about 500 micromicrofarads, inductance L1 and inductance L2 about 1.2 microhenries, inductance L3 about 0.13 microhenrie, resistor R1 about 12 ohms, resistor R2 about 100,000 ohms, and resistor R3 about 12,000 ohms, the crystal element 1 being a thickness mode AT cut quartz crystal disc 1 provided with a single pair of electric field-producing electrodes 31 and having a harmonic thickness mode frequency of a value from about 15 to 50 megacycles per second.

Figure 18:
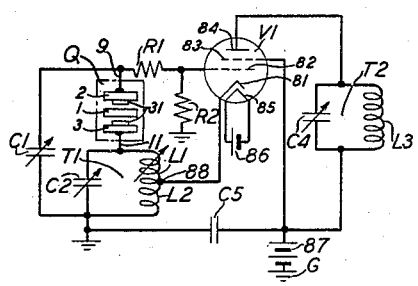

Fig. 18 is a circuit diagram showing a modification of the crystal-controlled oscillation generator illustrated in Fig. 17, the tuned circuit T2 being, in Fig. 18, placed in the position of the resistor R3 of Fig. 17. The circuits shown in Figs. 17 and 18 are essentially balanced crystal circuits connected between the control grid electrode 82, the cathode electrode 81 and the screen grid electrode 83 of the vacuum tube V1. The static capacitance of the crystal unit Q may be balanced out by proper adjustment of the trimmer condenser C1. To operate a high harmonic mode crystal element 1 to produce and control electrical oscillation, it is necessary to arrange the circuit so that the crystal element's parallel or shunt capacity is reduced to zero or to a value which corresponds to the particular circuit requirements. When a crystal unit as shown in Fig. 1, with capacity distribution as shown in Fig. 1A, is inserted at Q in a circuit like Fig. 17 or 18, it will be seen that the capacity $C_B$ of Fig. 1A will parallel the condenser C1 in Figs. 17 and 18, and merely reduce the value necessary in the condenser C1. The capacity $C_C$ of Fig. 1A will parallel the condenser C2 in Figs. 17 and 18 and merely reduce the value necessary for this capacity. The only capacity providing coupling between the coils L1 and L2 in Figs. 17 and 18 will be $C_A$ of Fig. 1A which is the static capacity of the quartz element 1 proper, and couplings by holder and socket capacities have been neutralized.

The plate circuit 84 in Figs. 17 and 18 is electron coupled to the grid-cathode circuit 83 and may be tuned by the condenser C4 in the output tuned circuit T2 to an electrical harmonic of the operating frequency of the crystal element 1 which itself may be operated at a mechanical harmonic of the fundamental frequency of the crystal element 1. The oscillator is crystal controlled by the crystal body 1 which may, if desired, be provided with a suitable temperature controlled oven (not shown). Oscillation takes place between the control grid 82 and the screen grid 83 of the oscillator tube V1 at a frequency which is a mechanical harmonic of the fundamental frequency of the crystal element 1, the crystal harmonic frequency $f$ being selected by the tuned circuit T1 consisting of the inductor L1, L2 and the parallel-connected capacitor C2 which if desired may comprise one or more parallel-connected condensers. The plate circuit 84 may be tuned by means of the tuned circuit T2 to an odd or an even order electrical harmonic of the oscillator frequency generated in the tuned circuit T1 at the crystal harmonic frequency. Since a high order mechanical harmonic may be generated by the crystal element 1, and since the output tuning circuit T2 may be tuned to a harmonic of that crystal harmonic frequency, a crystal controlled output frequency of a high order in megacycles per second may be obtained.

It will be understood that the harmonic thickness-mode vibration of the crystal element 1 is of particular interest in order to obtain very high frequencies. For this purpose, the mechanical harmonic of the crystal element 1 may be any odd order harmonic such as that up to the 33rd harmonic of the fundamental shear mode thickness vibration in an AT or BT cut quartz crystal element 1, for example. Accordingly, the type of harmonic crystal unit and circuit involved in this specification makes commercially available an upwardly extended frequency range of reliable crystal controlled operation. The crystal element 1 itself may be reliably operated up to 170 megacycles per second or higher, depending on the circuit used.

In the particular circuits illustrated in Figs. 17 and 18, there is only one vacuum tube V1 used, with a resultant saving in the number of vacuum tubes used for operation at high frequencies. Other advantages may be that the magnitude and number of undesired response frequencies may be reduced, the radiation of the crystal fundamental and harmonic frequencies may be reduced or eliminated, the possibility of obtaining transmitter operation on other than the correct frequency is reduced, and the higher crystal oscillator frequencies obtained are generally advantageous.

Figure 19:
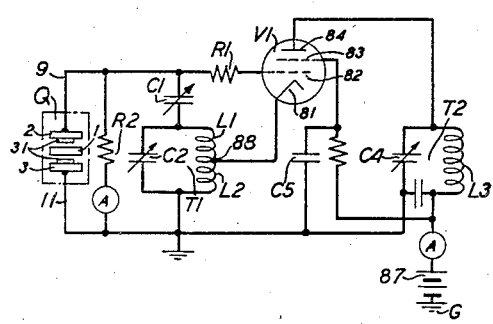

Fig. 19 is a circuit diagram illustrating a modification of the oscillator circuits shown in Figs. 17 and 18, the crystal unit Q and the condenser C1 being interchanged in position. It will be understood that the circuit shown in Fig. 19 may also be used to operate the crystal element 1 at a mechanical harmonic vibration of the fundamental thickness-mode crystal frequency vibration. The type of crystal circuit shown in Figs. 17 to 19 is essentially a bridge balanced circuit where the trimmer capacitor C1 balances out the static capacitance of the crystal unit Q, and the cathode tuning circuit T1 is tuned to a harmonic of the fundamental frequency of the crystal element 1, and the plate tuning circuit T2 is tuned to 1, 2, 3, 4, etc. times the crystal harmonic frequency.

Figure 20:
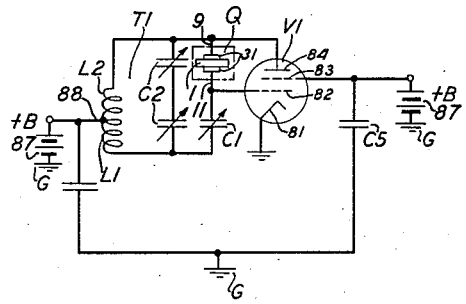

Fig. 20 is a circuit diagram illustrating another modification of oscillator circuit which may be used to operate the crystal element 1 at a mechanical thickness-mode harmonic thereof. In this arrangement, the tuned circuit T1 comprising two series-connected condensers C2, instead of a single condenser C2 as in Figs. 17 to 19, is shunted by the series-connected crystal element 1 and the balancing condenser C1, and is connected with the plate electrode 84 of the vacuum tube V1. The balancing condenser C1 functions to balance out the static capacitance of the crystal unit Q. For this purpose, the capacitance of the condenser C1 may be made approximately equal to the static capacitance of the crystal unit Q multiplied by the ratio of inductances involved in the coils L2 and L1, respectively. The plate supply for the plate electrode 84 and the screen grid electrode 83 may be obtained from the same or separate supply sources 87. The circuit illustrated in Fig. 20 may conveniently be operated up to some 70 megacycles per second using a crystal unit Q of the type illustrated in Fig. 1. It will be noted that the oscillator circuits illustrated in Figs. 17 to 20 employ a single vacuum tube V1, and a crystal element 1 which is provided with a single pair of electric field-producing electrodes 31, which may be of the type illustrated in Figs. 1 to 5.

As indicated hereinbefore, the oscillator circuits shown in Figs. 17 to 20 utilize a crystal element 1 having a single pair of field-producing electrodes 31, which may be of the construction illustrated in Figs. 1 to 5. For use with crystal elements employing two effective pairs of crystal electrodes 31A and 31B as illustrated in Figs. 6 to 16, oscillator circuits as illustrated in Figs. 21 and 22 may be employed.

Figure 22:
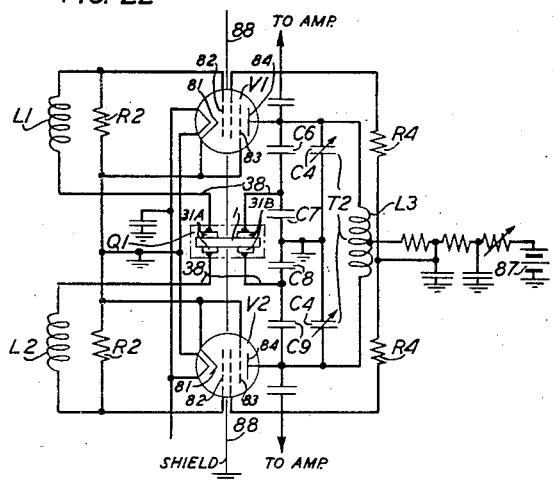
Figure 21:
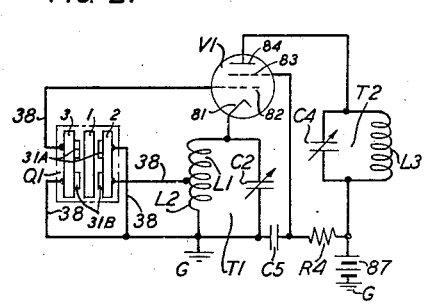

Figs. 21 and 22 are circuit diagrams illustrating examples of high frequency oscillator circuits which may be used with a single crystal element 1 having two effective sets of opposite field-producing electrodes 31A and 31B. The crystal impedance in the circuits shown in Figs. 21 and 22 does not have to be positive at resonance for useful operation, and no balancing or bridge network to balance or cancel the static capacity of the crystal unit Q is necessary for useful operation. Examples of crystal electrode arrangements wherein the crystal element 1 is provided with two effective pairs of field-producing electrodes 31A and 31B are illustrated in Figs. 6 to 16. The idealized or theoretical electrical equivalent of the crystal element 1 provided with two such sets of field-producing electrodes 31A and 31B comprises in effect a transformer having primary and secondary windings, a series-connected resistance and capacitance, and a shunt-connected capacitance associated therewith. When an alternating voltage is impressed between the pair of electrode terminals 31A, the alternating voltage being of a frequency corresponding to the fundamental or harmonic resonant vibration of the quartz crystal plate 1, a mechanical vibration is set up in the quartz plate 1. This mechanical vibration is propagated through the mass of the quartz body 1 to the second set of electrode terminals 31B and develops a difference of potential between the pair of terminals 31B, due to the piezoelectric qualities of the crystal plate 1. The difference of potential between the pair of terminals 31B has the same or similar qualities as the voltage applied between the pair of terminals 31A, less the attenuation through the crystal plate 1.

Fig. 21 is a circuit diagram illustrating an example of a single tube oscillation generator operated with the piezoelectric crystal element 1. The tuned circuit T1 may be tuned to the operating frequency *f* of the crystal element 1, where *f* may be the fundamental or an overtone of the fundamental thickness-mode frequency vibration of the piezoelectric crystal element 1; and the tuned circuit T2 in the plate circuit 84 of the vacuum tube V1 may be tuned to a frequency *nf* where *n* is a value 1, 2, 3, etc. and where *f* is, as hereinbefore mentioned, the operating frequency of the crystal element 1. In the circuit as illustrated in Fig. 21, the oscillation is generated between the screen circuit 83 and the input circuit including the crystal unit Q and the input tuned circuit T1 connected between cathode 81 and the control grid 82 of the vacuum tube V1, the plate circuit 84 being electron coupled with the screen circuit 83 and tuned by means of the plate tuning circuit T2.

Fig. 22 is a circuit diagram of a modification illustrating an example of the push-pull type oscillation generator which may be used to operate the piezoelectric crystal element 1 at high harmonic thickness-mode frequencies. The tuned circuit T2 comprising the coil L3, and the two condensers C4 in the plate circuits 84 of the two tubes V1 and V2 may be turned to any harmonic mode of motion of the crystal element 1 such as up to 170 or higher megacycles per second using tubes such as the 6AK5 or similar tubes. As high as a 33rd harmonic of an AT cut quartz plate 1 has been made to vibrate in this circuit. It will be noted that some of the output of the two tubes V1 and V2 is coupled into the crystal element 1 at the terminals 31B through the coupling condensers C6, C7, C8 and C9. When the frequency of the energy fed to the terminals 31B coincides with the frequency of one of the harmonic modes of the crystal element 1, the crystal element 1 will vibrate and impress a like potential across the terminals 31A which in turn impress this potential on the grids 82 of the tubes V1 and V2. This potential is then amplified by the tubes V1 and V2 and the above process repeated to sustain oscillation. As has been mentioned, this type of crystal oscillator is especially usuable between 50 and 150 megacycles per second. The coils L1 and L2 may be inserted between the terminals 31A and the grids 82 to increase the input impedance at the oscillator. To simplify the circuit of Fig. 22, the terminals 31B of the crystal element 1 may be coupled to the coil L3 at each side of the center tap, such that the proper impedance ratio is obtained between the tuned circuit T2 and the crystal unit. The coils L1 and L2 may be omitted and the terminals 31A connected directly to the grids 82. Such a circuit would be usable in practice up to 120 megacycles when used with tubes such as the 6AK5 or similar tubes.

While particular forms of oscillator circuits have been illustrated in Figs. 21 and 22 for operating the crystal element 1 when provided with the two effective pairs of crystal electrodes 31A and 31B, it will be understood that other types of circuits may be utilized therewith for useful operation.

It will be noted that the crystal units and oscillator circuits described herein are suitable for utilization of the harmonic thickness-mode of vibration of piezoelectric crystals 1 in the frequency spectrum thereof from below 15 up to 150 megacycles and higher, and that the crystal element 1 may be operated at its mechanical harmonic frequency by means of a single pair of crystal electrodes 31 as illustrated in Figs. 1 to 5, or by means of two pairs of crystal electrodes 31A and 31B as illustrated in Figs. 6 to 13.

Although this invention has been described and illustrated in relation to specific arrangements, it is to be understood that it is capable of application in other organizations and is therefore not to be limited to the particular embodiments disclosed.

What is claimed is:

1. Piezoelectric crystal apparatus comprising a piezoelectric crystal body, a pair of field-producing electrodes for said crystal body, connectors for said pair of electrodes, an enclosing metallic holder for said connectors and crystal body, said holder and said connectors constituting capacitance means disposed in shunt or parallel relation with respect to said crystal body, and circuit means connected across said connectors for in effect reducing said shunt capacitance provided by said holder and said connectors and paralleling said crystal body to a substantially zero value.

2. Piezoelectric crystal apparatus including a piezoelectric crystal body, a pair of insulating electrode plates each having salient portions and a central field-producing electrode area, said salient portions comprising metallic coatings deposited on said insulating plates and projecting above said central electrode area, means for resiliently clamping said crystal body between said electrode plates with said metallic salient portions engaging said crystal body adjacent the peripheral region thereof, and conductive means for establishing individual electrical connections with each of said central electrode areas through openings in the body of each of said insulating electrode plates.

3. Piezoelectric crystal apparatus including a piezoelectric crystal body, a pair of insulating electrode plates each having salient portions and a central field-producing electrode area, said salient portions comprising metallic coatings deposited on said insulating plates and projecting above said central electrode area, means for resiliently clamping said crystal body between said electrode plates with said metallic salient portions engaging said crystal body adjacent the peripheral region thereof, and conductive means for establishing individual electrical connections with each of said central electrode areas through openings in the body of each of said insulating electrode plates, said electrical connection means including said clamping means.

4. Piezoelectric crystal apparatus comprising a piezoelectric crystal disc, a pair of ceramic discs each having clamping lands and a conducive central field-producing electrode area, said clamping lands comprising a plurality of spaced areas of metallic coatings formed integral with said ceramic discs, means for clamping said crystal disc between said ceramic discs with said clamping lands engaging said crystal disc adjacent the peripheral region thereof, and means including said central electrode areas for operating said crystal disc at a mechanical harmonic of its fundamental thickness mode frequency.

5. Piezoelectric crystal apparatus comprising a piezoelectric crystal element having substantially circular major faces, the thickness dimension between said major faces being made of a value corresponding to the frequency of said crystal element, a pair of equal sized circular-shaped insulating members having circular shaped conductive electrode coatings formed integral with the central portions only of the adjacent major faces of said insulating members, said central conductive coatings being disposed opposite each other and forming electric field-producing electrodes spaced entirely inwardly of all of the peripheral edges of said major faces of said crystal element, means including metallic coatings formed integral with outer portions of said adjacent major faces of said insulating members for clamping said crystal element therebetween, and means for establishing individual electrical connections with said central electrode coatings.

6. Piezoelectric crystal apparatus comprising a piezoelectric crystal plate having circular shaped major faces, a pair of equal-sized circular-shaped ceramic insulating members of low temperature coeffiecient of expansion, conductive electrode coatings formed integral with the central portions of the inner major faces of said insulating members, risers comprising separated metallic coatings formed integral with said inner major faces of said insulating members and engaging the margins of said major faces of said crystal plate, an enclosing metallic container having opposite insulating end portions, means including metallic pins cooperating with said opposite end portions of said container for clamping said piezoelectric crystal plate between said risers, and means for establishing individual electric connections with said central electrode coatings through said pins.

7. Piezoelectric crystal apparatus comprising a harmonic thickness mode piezoelectric quartz crystal element having substantially circular major faces, the thickness dimension of said crystal element between said major faces corresponding to said harmonic thickness mode frequency, a pair of circular-shaped equal-sized ceramic discs having flat faces presented to said major faces of said crystal element, a pair of equal-sized and oppositely disposed field producing evaported metallic films formed integral with the central portions of said flat ceramic faces, spaced entirely inwardly of the peripheral edges thereof and spaced by gaps from said major faces of said crystal element, and evaporated metallic films formed integral with the outer portions of said flat faces of said ceramic discs and disposed in contact with the peripheral portions of said major faces of said crystal element, said evaporated metallic films being made of thickness values to provide said gaps.

8. A resonator comprising a piezoelectric crystal body, and electrode members adjacent the major faces of said crystal body, said electrode members each consisting of a ceramic plate having a plurality of conductive coatings formed integral with its inwardly disposed surface, said plurality of coatings comprising a central field-producing electrode coating and clamping coatings, said coatings constituting means for critically spacing said central electrode coatings from said crystal body.

9. In combination, a piezoelectric crystal body, a plate-like element composed of insulating material and having a plurality of risers thereon presented to said crystal body, at least one of said risers constituting a field-producing electrode surface on said plate-like element, and means for exerting a clamping pressure upon said crystal body through others of said risers, said plurality of risers comprising metallic coatings formed integral with a major face of said plate-like insulating element.

10. An electrode member for a piezoelectric crystal body comprising a circular shaped ceramic plate having a central metallic riser constituting a field-producing electrode surface, and outer metallic risers on said circular ceramic plate constituting means through which a clamping force is applied to the crystal body, all of said risers comprising metallic coatings formed integral with a major surface of said ceramic plate.

11. An electrode for a piezoelectric crystal body comprising a plate-like element composed of insulating material having a plurality of risers thereon comprising metallic coatings formed integral with a surface thereof facing said crystal body, one of said metallic risers constituting a field-producing electrode surface and another of said metallic risers constituting a portion of said element through which a clamping force is applied to said crystal body.

12. An electrode for a piezoelectric crystal body comprising a plate-like element composed of insulating material and having a plurality of metallic risers thereon positioned to contact the crystal body at spaced areas about the margin thereof, and other metallic riser comprising a central field-producing electrode area on said plate-like element and projecting from said plate-like element a distance less than that of said marginal risers, all of said risers comprising metallic coatings formed integral with a single flat major surface of said plate-like element.

13. A pressure type electrode member for a piezoelectric crystal element comprising an insulating plate having a substantially flat major face disposed adjacent a major surface of said crystal element, separated metallic films formed integral with the outer and central portions of said major face of said insulating plate, said metallic films comprising means for obtaining a precision air-gap spacing of said central portion film area with respect to said major surface of said crystal element, said central portion film area being divided into separate parts constituting means for applying separate electric fields to said crystal element.

14. A pressure type electrode member for a piezoelectric crystal element comprising an insulating plate having an opening therein extending from one to the other of its opposite major faces, metallic clamping lands and a metallic central field-producing electrode on one of said major faces, a connection terminal on the other of said major faces, and a connector conductively connecting said central electrode with said terminal through said opening, and said lands, central electrode, and connector comprising metallic coatings formed integral with the surfaces of said insulating plate.

15. A pressure type electrode member for a piezoelectric crystal body comprising a ceramic disc having on one of its major faces a plurality of raised clamping lands and a central field-producing electrode, and having on its opposite major face a terminal, said lands and central electrode comprising evaporated metallic coatings formed integral with said one major face of said ceramic disc, and conductive means electrically connecting said central electrode with said terminal through a hole in the body of said ceramic disc comprising metallic coating disposed within said hole.

16. A pressure type electrode member for a piezoelectric crystal body comprising a ceramic insulating disc having an opening therethrough, a plurality of raised clamping lands comprising separated metallic coatings of evaporated silver formed integral with the peripheral portion of one major face of said ceramic disc, an electric field-producing electrode comprising a metallic coating of evaporated silver formed integral with the central portion of said one major face and having a height less than that of said peripheral lands, and a connector comprising baked metallic silver paste disposed within the walls of said opening and conductively extending from said evaporated central electrode coating toward the opposite major face of said ceramic disc.

17. A pressure type electrode member for a high frequency harmonic thickness mode piezoelectric quartz crystal body adapted to be mounted in a holder, said electrode member comprising a ceramic circular-shaped disc composed of insulating material having substantially a zero temperature coefficient of expansion and having its flat major faces made substantially of the same area and shape as those of the major faces of said crystal body, a substantially circular-shaped electric field producing metallic silver film of selected area and thickness evaporated on the central portion only of one of said major faces of said ceramic disc and spaced concentrically and entirely inwardly of all of the peripheral edges of said ceramic disc and spaced by a gap from the adjacent major face of said crystal to provide an air-gap therebetween of the order of 10 to 20 microns, a plurality of electrically separate arcuate-shaped metallic silver films of selected thickness evaporated on the peripheral portion only of said one of said major faces of said ceramic disc and comprising raised portions having flat surfaces disposed in contact with the peripheral portion of said adjacent major face of said crystal body, and raised portions being made of a thickness value for said films that is sufficiently greater than that of said central electrode film to provide said value of air-gap between said central film and said adjacent face of said crystal body, a baked silver paste coating formed integral with the opposite major face of said ceramic disc, said ceramic disc having transverse holes therein located on a diameter at regions equidistant from the center of said major faces of said ceramic disc, said holes being slightly enlarged at each of the opposite ends thereof adjacent said major faces of said ceramic disc, and conductive baked silver paste coatings within the walls of said holes electrically connecting said central film on said one of said major faces of said ceramic disc and with said coating on said opposite major face of said ceramic disc.

18. An oscillation system comprising an electron tube having cathode, control grid, screen grid and plate electrodes, a tuned plate circuit connected in circuit relation with said plate electrode, a tuned cathode circuit connected in circuit relation with said cathode and control grid electrodes, a piezoelectric crystal element having electrodes connected in circuit relation with at least one of said tuned circuits, said crystal electrodes comprising a pair of insulating bodies of substantially zero temperature coefficient of expansion having at least one pair of opposite metallic coatings formed integral therewith for establishing at least one electrical field through said crystal element disposed therebetween connector terminals including said electrodes for said crystal element, a holder for said connector terminals and said crystal element, said holder and said connector terminals constituting static capacitance means disposed in shunt circuit relation with respect to said crystal element, and a capacitor electrically connected across said connector terminals, said cathode tuned circuit, said crystal holder and connector terminals and said capacitor constituting a balanced circuit wherein said capacitor comprises means for balancing out said static capacitance of said crystal holder and connector terminals, said tuned cathode circuit being tuned to a mechanical harmonic of the fundamental thickness mode frequency of said crystal element, and said tuned plate circuit being tuned to an electrical harmonic of said mechanical harmonic frequency of said crystal element.

19. An oscillation system comprising an electron tube having cathode, control grid and plate electrodes, a tuned plate circuit connected in circuit relation with said plate electrode, a tuned cathode circuit connected in circuit relation with said cathode and control grid electrodes, a piezoelectric crystal element having electrodes connected in circuit relation with at least one of said tuned circuits, said crystal electrodes comprising a pair of insulating bodies of substantially zero temperature coefficient of expansion having at least one pair of opposite metallic coatings formed integral therewith for establishing at least one electrical field through said crystal element disposed therebetween, connector terminals including said electrodes for said crystal element, a holder including a metallic container for said connector terminals and said crystal element, said holder and said connector terminals constituting static capacitance means disposed in shunt circuit relation with respect to said crystal element, and circuit means including a balancing capacitor electrically connected across said connector terminals for in effect reducing said shunt capacitance of said static capacitance means shunting said crystal element to a substantially zero value, said tuned cathode circuit being tuned to a mechanical harmonic of the fundamental thickness mode frequency of said crystal element, and said tuned plate circuit being tuned to an electrical harmonic of said mechanical harmonic frequency of said crystal element.

HARALD HAVSTAD.

REFERENCES CITED

The following references are of record in the file of this patent:

UNITED STATES PATENTS

| Number | Name | Date |
|---|---|---|
| 1,783,131 | Ohl | Nov. 25, 1930 |
| 1,990,822 | Goldstine | Feb. 12, 1935 |
| 2,015,836 | Bechmann et al | Oct. 1, 1935 |
| 2,058,260 | Reinartz | Oct. 20, 1936 |